United States Patent [19]

Harnish

[11] 4,100,935
[45] Jul. 18, 1978

[54] CHECK VALVE FOR HEAT PUMP SYSTEMS

[75] Inventor: James Ranck Harnish, York, Pa.

[73] Assignee: Borg-Warner Corporation, Chicago, Ill.

[21] Appl. No.: 792,070

[22] Filed: Apr. 28, 1977

[51] Int. Cl.² .............................................. F16K 15/04
[52] U.S. Cl. ............................ 137/533.11; 137/533.19
[58] Field of Search ....................... 137/533.11, 533.13, 137/533.15, 533.19

[56] References Cited

U.S. PATENT DOCUMENTS

| 3,260,279 | 7/1966 | Liebman | 137/533.15 |
| 3,323,560 | 6/1967 | Ehlers | 137/533.13 |

Primary Examiner—Robert G. Nilson
Attorney, Agent, or Firm—Thomas B. Hunter

[57] ABSTRACT

An improvement in ball-type check valves of the type used in heat pump systems. The valve is designed so that the pressure differential across the ball is significantly higher than in prior art devices. This assures that the ball is held away from the seat in the full flow mode, even when the valve is installed in a vertical position.

5 Claims, 5 Drawing Figures

CHECK VALVE FOR HEAT PUMP SYSTEMS

BACKGROUND OF THE INVENTION

1. Field of the Invention

Ball type check valves of the type used in heat pump systems.

2. Description of the Prior Art

Bulletin CV-2 — Mechaniwatt Corp. This product bulletin describes a typical prior art ball check valve which is illustrated in FIGS. 2 and 3.

SUMMARY OF THE INVENTION

In a typical heat pump system, means are provided for reversing the flow of refrigerant through the system so that the unit can operate both as a heating and cooling apparatus. In the cooling mode, hot refrigerant gas is delivered through a reversing valve to an outdoor coil over which ambient air is circulated. The refrigerant vapor condenses and flows from the outdoor coil through a capillary or expansion valve to the indoor coil which functions as an evaporator. The low pressure refrigerant evaporates in the indoor coil and heat is abstracted from room air circulating over the coil. The cold refrigerant gas then returns to the suction side of the compressor through another portion of the reversing valve.

In the heating mode, the reversing valve is switched to its alternate position which directs hot gas directly to the indoor coil, delivering heat to the room air. From there it flows through an expansion device to the outdoor coil and then back through the reversing valve to the suction side of the compressor. In order to avoid the use of an inordinate member of solenoid actuated valves, it is quite common to design the refrigerant circuit to include several relatively inexpensive check valves which automatically switch position from full-flow to no-flow, and vice versa, when the flow of refrigerant is redirected by the reversing valve.

The most common type of check valve, and the most practical in terms of cost and reliability, is a ball-type valve in which the ball is permitted some freedom of movement away from a seat. When flow is through the valve, the ball is lifted off the seat and fluid moves around the ball to the outlet side of the valve. When the flow is reversed, the fluid forces the ball element against the seat and prevents flow.

These check valves usually work quite well in almost any position; but it has been found that when installed in a vertical position, such that the ball has to be moved vertically upward to assume the full-flow position, there is insufficient pressure drop across the ball to maintain it off the seat. This is especially critical under certain low refrigerant flow conditions which sometimes exist in a heat pump system. This causes the ball to drop back intermittently onto the seat and results in annoying chatter of the valve.

In the present invention the valve is designed so that there is a significantly greater pressure drop developed across the ball when it is in the full-flow position. This pressure differential is sufficient to counteract the force of gravity tending to pull the ball back onto the seat and is quite effective in maintaining full-flow without chatter.

DETAILED DESCRIPTION OF THE INVENTION

Figure 1:
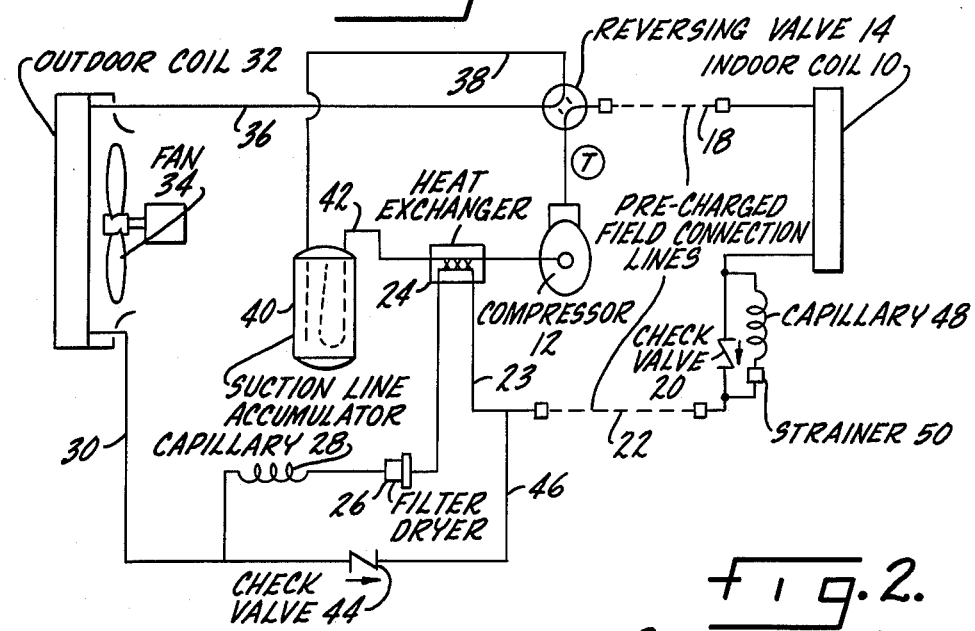
FIG. 1 is a schematic diagram of a heat pump system utilizing check valves in the refrigerant circuit.

FIG. 1 shows a typical heat pump system for either heating or cooling a space as heat is pumped into or abstracted from an indoor coil 10. Refrigerant vapor is compressed in compressor 12 and delivered to a reversing valve 14, which in its solid line position, indicates the heating mode for the system. Hot gas is delivered through a precharged field connection line 18 to the indoor coil 10 where it rejects heat into the enclosed space by the circulation of room air thereof by means of a fan (not shown). The refrigerant then flows through check valve 20 which would then be in its full-flow position. The refrigerant then flows through lines 22 and 23 to heat exchanger 24 and then through a filter drier 26 and then through a capillary 28, line 30 to the outdoor coil 32. The refrigerant abstracts heat from the air flowing over the outdoor coil as circulated by fan 34 and then flows through line 36 to reversing valve 14, and via line 38 to the suction line accumulator 40. It then passes in indirect heat exchange relation with refrigerant flowing through line 23 and heat exchanger 24 and continues through line 42 to the suction side of compressor 12 to complete the circuit.

In the cooling mode, the reversing valve 14 is moved to its dotted line position so that refrigerant vapor compressed in compressor 12 flows through line 36 to the outdoor coil 32 where it condenses. The liquid refrigerant then flows through line 30 and check valve 44, lines 46 and 22 through capillary 48 and strainer 49 to the indoor coil 10 which now functions as an evaporator. The heat is abstracted from the indoor air causing the refrigerant to vaporize. The low pressure vapor flows through line 18, reversing valve 14 and line 38 to the suction line accumulator 40. It returns to the compressor suction through line 42.

Figure 2:
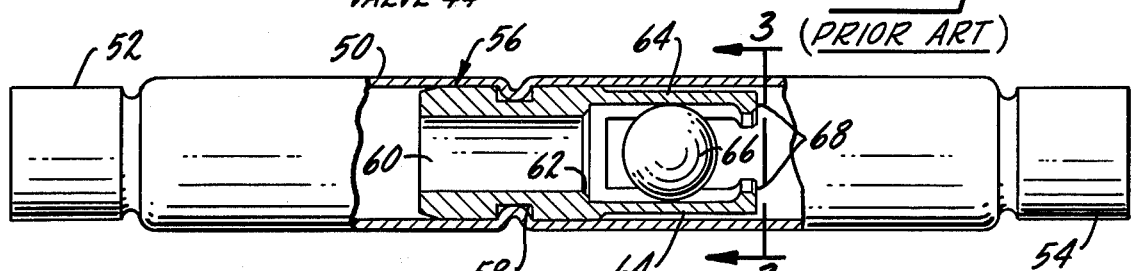
FIG. 2 is an elevation view, partly broken away and shown in cross-section, of a prior art check valve.
Figure 3:
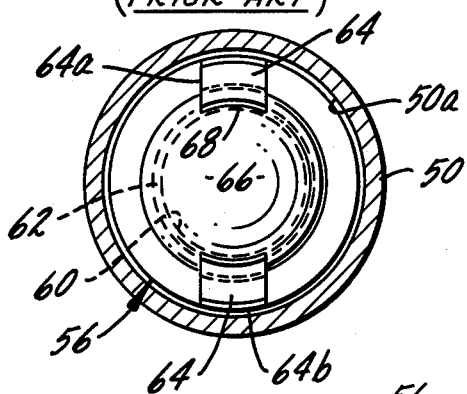
FIG. 3 is a cross-section view taken along the plane of line 3—3 of FIG. 2.

As shown in FIGS. 2 and 3, the typical check valve of the prior art includes tubular housing or sleeve 50 with appropriate fittings 52, 54 on opposite ends to facilitate its connection into a refrigerant line. The check valve body 56 is held in a fixed position by crimping the sleeve 50 into a groove 58 encircling the valve body. Valve body 58 includes a central passage 60 having a valve seat 62 formed at one end thereof and a pair of axially extending arms 64 which provide a cage for the ball 66. The terminal portion of each arm is provided with an inturned portion 68 to prevent the ball from moving out of its track when in the full-flow position. It will be noted that there is a substantial area between the arms 64 for the flow of fluid around the ball. More specifically, the flow area is defined by the outside surface of the ball, the space between the side faces 64a of each arm, the outer surfaces 64b of each arm, and the inside surface 50a of the sleeve 50. This creates some difficulty in that insufficient pressure drop is established across the ball to maintain it in its shown position when the valve is oriented vertically with the valve seat below the ball. The ball, being formed of stainless steel and therefore relatively heavy, will drop back onto the seat under low flow. This will cause intermittent flow and vibration of the ball within the channel located between arms 64.

Figure 5:
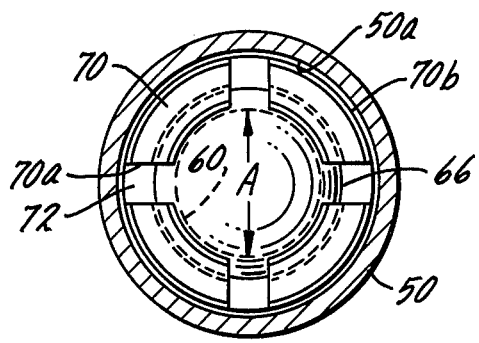
FIG. 5 is a view similar to FIG. 3 of the subject check valve.
Figure 4:
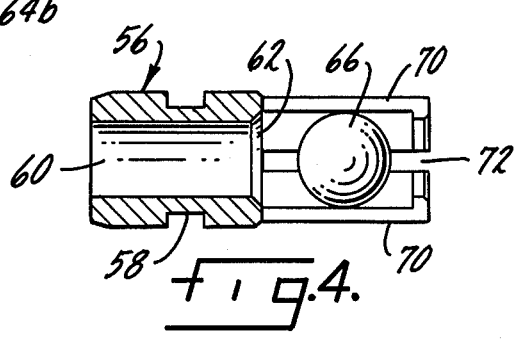
FIG. 4 is a view, similar to FIG. 2 but with the sleeve removed, of a check valve embodying the principles of the present invention.

FIGS. 4 and 5 are similar to the illustrations in FIGS. 2 and 3 respectively. Identical reference numerals are used where the structure is the same as that of FIGS. 2 and 3.

In the present invention, the arms 70 for guiding the ball are more numerous (four being a reasonable number for a standard size valve). They are also more closely spaced so that a plurality of very narrow slots 72 are formed between adjacent arms for the flow of fluid around the ball 66.

There is an important relationship between the area available for flow past the ball in its open position and the area through passage 60 and seat 62. This available area should be 15-35% of the total area (shown at A) across the flow passage 60 and seat 62.

As best shown in FIG. 5, the flow area is defined by the outside of the ball 66, the slots 72 between the side faces 70a of arms 70, the outer surfaces 70b of arms 70 and the inside surface 50a of sleeve 70.

While this invention has been described in connection with a certain specific embodiment thereof, it is to be understood that this is by way of illustration and not by way of limitation; and the scope of the appended claims should be construed as broadly as the prior art will permit.

What is claimed is:

1. A check valve comprising a generally cylindrical valve body adapted to be held within a tubular sleeve, said valve body having a central fluid passage terminating with a valve seat on the outlet side thereof; a moveable ball member adapted to engage said valve seat and prevent fluid flow when seated; means defining a cage for said ball member including a plurality of arms extending axially with a stop portion to arrest further movement of said ball member, the cross-sectional area of said arms blocking flow around said ball member to the extent that the flow area past the ball, when the valve is in its open position, is between 15-35% of the area across said central fluid passage.

2. A check valve as defined in claim 1 wherein said plurality of arms are equidistantly and circumferentially spaced from each other and include surfaces defining a series of narrow slots therebetween for the flow of fluid, said slots and the space defined between said tubular sleeve providing the only fluid flow path past said ball member when it is engaged with said stop portion.

3. In a heat pump system of the type including at least one check valve in the refrigerant circuit, said check valve including a generally cylindrical valve body adapted to be held within a tubular sleeve connected in series with refrigerant line in said refrigerant circuit, said valve body having a central fluid passage terminating with a valve seat on the outlet side; a moveable ball member adapted to engage said valve seat and prevent fluid flow when seated; means defining a cage for said ball member including a plurality of arms extending axially with a stop portion to arrest further movement of said ball member, the cross-sectional area of said arms blocking flow around said ball member to the extent that the flow area past the ball, when the valve is in its open position, is between 15-35% of the area across said central fluid passage.

4. The combination as defined in claim 3 wherein said valve body is oriented vertically with said ball member located above said valve seat.

5. The combination as defined in claim 4 wherein said plurality of arms are equidistantly and circumferentially spaced from each other and include surfaces defining a series of narrow slots therebetween for the flow of fluid, said slots and the space defined between said arms and said tubular sleeve providing the only fluid flow path past said ball member when it is engaged with said stop portion.

* * * * *